US009557862B2

(12) United States Patent
Ho et al.

(10) Patent No.: US 9,557,862 B2
(45) Date of Patent: Jan. 31, 2017

(54) BEND SENSOR, BEND SENSING METHOD AND BEND SENSING SYSTEM FOR FLEXIBLE DISPLAY PANEL

(71) Applicant: INDUSTRIAL TECHNOLOGY RESEARCH INSTITUTE, Hsinchu (TW)

(72) Inventors: Chang-An Ho, Keelung (TW); Chih-Hung Wu, New Taipei (TW); Yi-Cheng Peng, Taoyuan County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 146 days.

(21) Appl. No.: 14/255,161

(22) Filed: Apr. 17, 2014

(65) Prior Publication Data

US 2015/0169091 A1 Jun. 18, 2015

(30) Foreign Application Priority Data

Dec. 17, 2013 (TW) .............................. 102146685 A

(51) Int. Cl.
 *G06F 3/044* (2006.01)
 *G06F 3/041* (2006.01)
(52) U.S. Cl.
 CPC ............. *G06F 3/044* (2013.01); *G06F 3/0416* (2013.01); *G06F 2203/04102* (2013.01)
(58) Field of Classification Search
 CPC ................... G06F 2203/04102; G06F 3/0412; G06F 3/045; G06F 3/0414
 See application file for complete search history.

(56) References Cited

U.S. PATENT DOCUMENTS

| 7,953,462 | B2 | 5/2011 | Harry | |
|---|---|---|---|---|
| 1,315,536 | A1 | 12/2011 | Chiou et al. | |
| 2003/0227441 | A1* | 12/2003 | Hioki ..................... | G06F 3/0412 345/156 |
| 2007/0247422 | A1 | 10/2007 | Vertegaal et al. | |
| 2008/0309622 | A1* | 12/2008 | Krah ..................... | G06F 3/0418 345/173 |

(Continued)

FOREIGN PATENT DOCUMENTS

CN 101369198 A 2/2009
CN 103197879 A 7/2013

(Continued)

OTHER PUBLICATIONS

Taiwanese Office Action dated Aug. 7, 2015.

(Continued)

*Primary Examiner* — Ryan A Lubit
(74) *Attorney, Agent, or Firm* — Rabin & Berdo, P.C.

(57) ABSTRACT

A bend sensor for a flexible display panel is provided. The bend sensor includes plural detecting electrodes and a controlling circuit. The plural detecting electrodes are disposed on a touch panel. The touch panel is attached on the flexible display panel. The plural detecting electrodes generate plural detecting signals according to a change of an electric field or a magnetic field. The controlling circuit receives the plural detecting signals and judges a bending status of the flexible display panel according to the plural detecting signals.

28 Claims, 10 Drawing Sheets

(56) References Cited

U.S. PATENT DOCUMENTS

| | | | |
|---|---|---|---|
| 2010/0097133 A1* | 4/2010 | Philipp | G06F 3/0416 327/551 |
| 2010/0141605 A1* | 6/2010 | Kang | G06F 1/1626 345/174 |
| 2010/0171708 A1 | 7/2010 | Chuang | |
| 2012/0133621 A1 | 5/2012 | Kim | |
| 2012/0256720 A1* | 10/2012 | Byun | H01C 10/10 338/2 |
| 2012/0293491 A1 | 11/2012 | Wang et al. | |
| 2013/0100053 A1* | 4/2013 | Kang | G06F 3/03 345/173 |
| 2013/0161075 A1 | 6/2013 | Lee et al. | |
| 2013/0162546 A1* | 6/2013 | Yeh | G06F 3/0221 345/173 |
| 2013/0176248 A1 | 7/2013 | Shin et al. | |
| 2013/0241921 A1 | 9/2013 | Kurtenbach et al. | |
| 2013/0257787 A1* | 10/2013 | White | G06F 3/0414 345/174 |
| 2013/0285968 A1* | 10/2013 | Christiansson | G06F 3/0416 345/173 |
| 2014/0015743 A1* | 1/2014 | Seo | G06F 1/1694 345/156 |
| 2014/0049464 A1* | 2/2014 | Kwak | G06F 3/0487 345/156 |
| 2014/0101560 A1* | 4/2014 | Kwak | G06F 1/1652 715/738 |
| 2014/0111417 A1 | 4/2014 | Son | |
| 2014/0139447 A1* | 5/2014 | Kang | G06F 3/044 345/173 |
| 2014/0204285 A1* | 7/2014 | Jang | G06F 3/044 349/12 |
| 2015/0022732 A1* | 1/2015 | Park | G06F 3/044 349/12 |

FOREIGN PATENT DOCUMENTS

| | | |
|---|---|---|
| EP | 2207079 A2 | 7/2010 |
| EP | 2613244 A2 | 7/2013 |
| JP | 2007-048237 A | 2/2007 |
| JP | 2010160775 A | 7/2010 |
| KR | 20100082286 A | 7/2010 |
| TW | 200846990 A | 12/2008 |
| TW | 201027163 A | 7/2010 |
| TW | 201033863 A | 9/2010 |
| TW | 201200939 A | 1/2012 |
| TW | 201248462 A | 12/2012 |
| TW | I393953 B | 4/2013 |
| TW | M455208 U | 6/2013 |
| TW | M455211 U | 6/2013 |

OTHER PUBLICATIONS

Schwesig et al., "Gummi: A Bendable Computer", CHI 2004, vol. 6, No. 1, pp. 263-270, Apr. 24-29, 2004, Vienna, Austria.

J. Wobbrock et al., "Maximizing the Guessability of Symbolic Input", pp. 1869-1872, CHI 2005, Apr. 2-7, 2004, Portland, Oregon, USA.

J. Scott et al., "Mobile Device Interaction with Force Sensing", Proceedings of Pervasive 2009, LNCS 5538, pp. 133-150, 2009.

B. Lahey et al., "PaperPhone: Understanding the Use of Bend Gestures in Mobile Devices with Flexible Electronic Paper Displays", CHI 2011, pp. 1303-1312, May 7-12, 2011, Vancouver, BC, Canada.

R. Balakrishman et al., "Exploring Interactive Curve and Surface Manipulation Using a Bend and Twist Sensitive Input Strip", Proceedings of 1999 ACM Symposium on Interactive 3D Graphics, pp. 111-118 and 228, 1999.

D. Gallant et al., "Towards More Paper-like Input: Flexible Input Devices for Foldable Interaction Styles", UIST'08, pp. 283-286, Oct. 19-22, 2008, Monterey, California, USA.

* cited by examiner

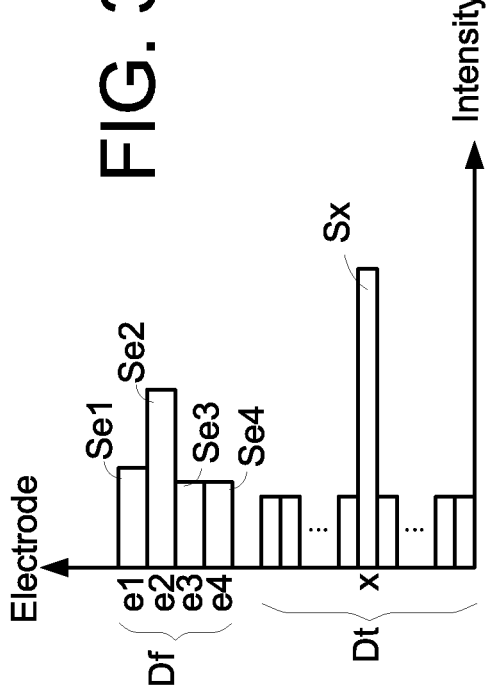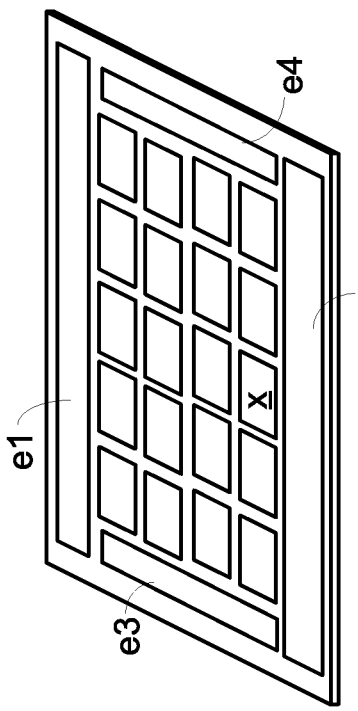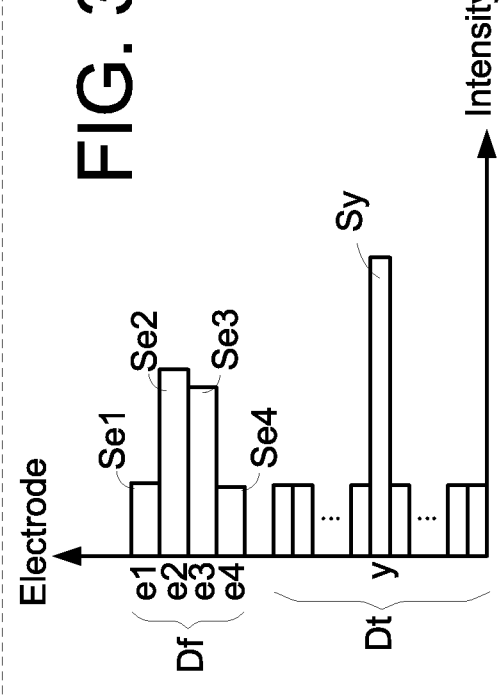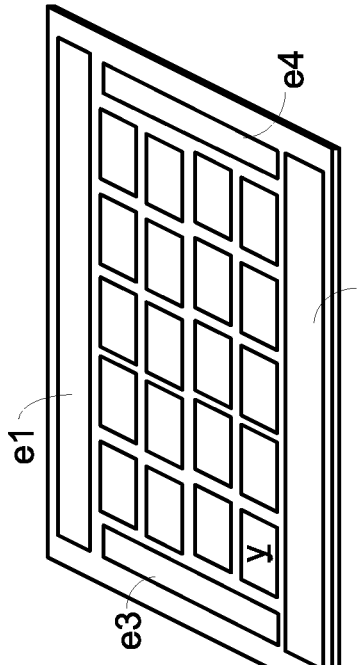

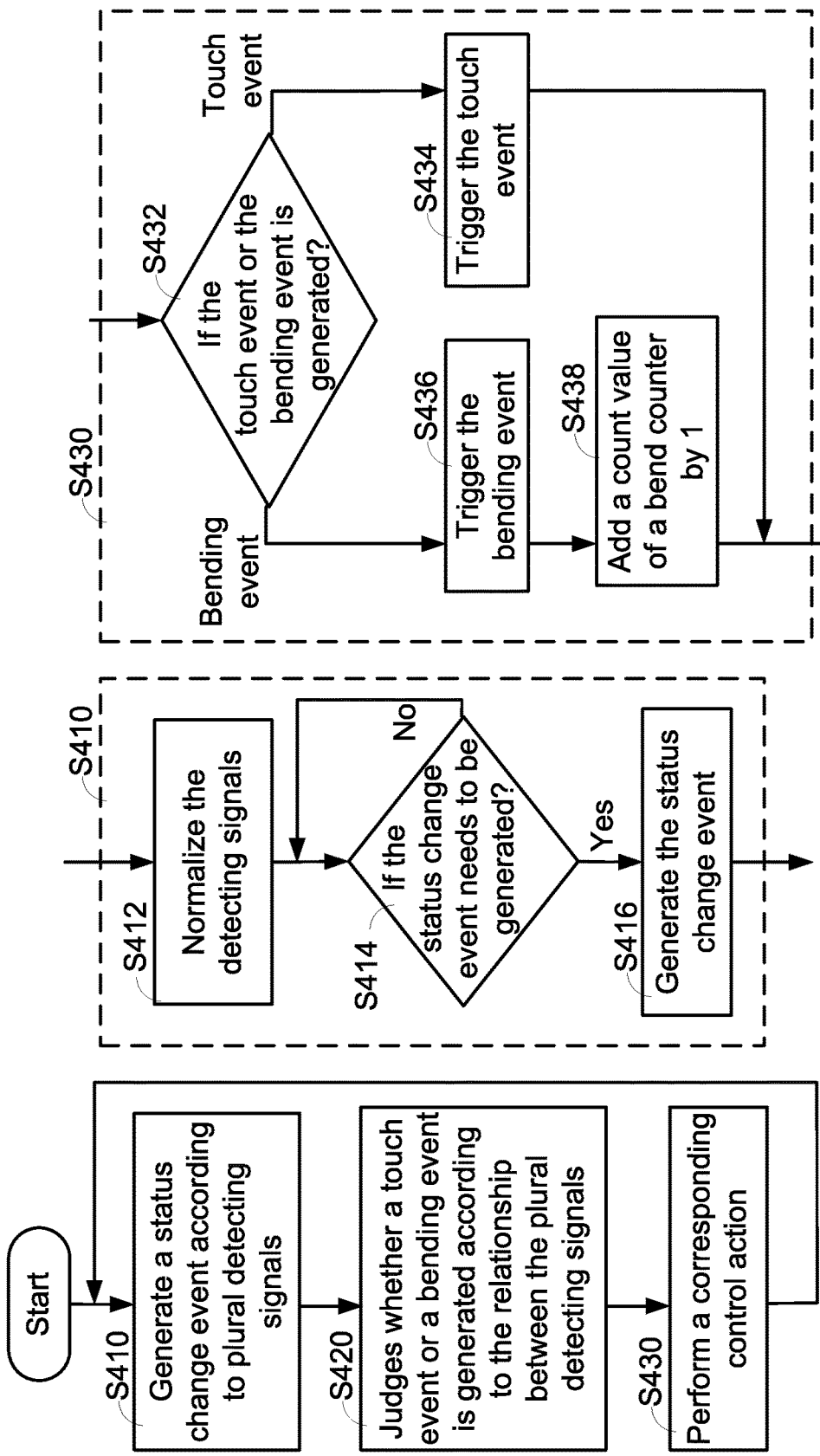

|  | Se1 | Se2 | Sdt | Se3 | Se4 |
|---|---|---|---|---|---|
| D1/θ0 | I(0,0) | I(0,1) | I(0,2) | I(0,3) | I(0,4) |
| D1/θ1 | I(1,0) | I(1,1) | I(1,2) | I(1,3) | I(1,4) |
| D1/θ2 | I(2,0) | I(2,1) | I(2,2) | I(2,3) | I(2,4) |
| ⋮ | | | | | |
| D2/θ0 | I(6,0) | I(6,1) | I(6,2) | I(6,3) | I(6,4) |
| D2/θ1 | I(7,0) | I(7,1) | I(7,2) | I(7,3) | I(7,4) |
| D2/θ2 | I(8,0) | I(8,1) | I(8,2) | I(8,3) | I(8,4) |
| ⋮ | | | | | |

BEND SENSOR, BEND SENSING METHOD AND BEND SENSING SYSTEM FOR FLEXIBLE DISPLAY PANEL

This application claims the benefit of Taiwan Patent Application No. 102146685, filed Dec. 17, 2013, the subject matter of which is incorporated herein by reference.

TECHNICAL FIELD

The disclosure relates to a sensor, a sensing method and a sensing system, and relates to a bend sensor, a bend sensing method and a bend sensing system for a flexible display panel.

BACKGROUND

With increasing advance of information technologies, the general trends in designing electronic devices are toward small size, light weightiness and easy portability. For example, after smart phones and tablet computers are introduced into the market, the smart phones and the tablet computers are gradually used to connect to the internet or browse data in order to replace the heavy and bulky notebook computers. Nowadays, the smart phones or the tablet computers are widely used to browse data, watch image data, execute application software or make a call. However, due to the size limitation of the smart phone or the tablet computer, the size of the display panel of the smart phone or the tablet computer is gradually reduced. Consequently, only small amount of messages can be simultaneously shown on the display panel.

Recently, a smart phone or a tablet computer with a flexible display panel is introduced into the market. The applications of the flexible display panel are no longer restricted by the rigidity of the conventional display panel. After the flexible display panel of the smart phone or the tablet computer is unfolded, more messages can be simultaneously shown on the flexible display panel. Consequently, the electronic device with the flexible display panel has small volume and large display area.

As known, the bent region of the flexible display panel is frequently used. Consequently, the image on the bent region of the flexible display panel is readily suffered from distortion. Under this circumstance, the image quality is unsatisfied.

Generally, the bending curvature, the bending frequency and other parameters are widely used for evaluating the conditions of the bent region of the flexible display panel. The bending curvature and the bending frequency may be acquired by a variety of bend sensors.

Conventionally, the bend sensors are disposed on a backside of the flexible display panel. The bend sensors include for example fiber-optic bend sensors, infrared bend sensors, force-feedback bend sensors or piezoelectric bend sensors. In views of cost-effectiveness and applications, the piezoelectric bend sensors are the most popular.

Generally, the resistance value of the piezoelectric bend sensor is changed according to the magnitude of the stress applied to the piezoelectric bend sensor, and the bending degree of the flexible display panel is correspondingly determined. Since the contact stress of the piezoelectric bend sensor is non-uniform and non-directional and the piezoelectric bend sensor is opaque, it is difficult to integrate the piezoelectric bend sensor into the flexible display panel and the applications of the flexible display panel are restricted.

Therefore, there is a need of providing an improved bend sensor and an improved bend sensing method in order to overcome the above drawbacks.

SUMMARY

The disclosure provides a bend sensor and a bend sensing method for a flexible display panel. During the process of bending the flexible display panel, the electric field or the magnetic field of the flexible display panel is subjected to change. Consequently, the bending status of the flexible display panel is sensed, and the bending direction and the bending angle of the flexible display panel are realized.

An embodiment of the disclosure provides a bend sensor for a flexible display panel. The bend sensor includes plural detecting electrodes and a controlling circuit. The plural detecting electrodes are disposed on a touch panel. The touch panel is attached on the flexible display panel. The plural detecting electrodes generate plural detecting signals according to a change of an electric field or a magnetic field. The controlling circuit receives the plural detecting signals and judges a bending status of the flexible display panel according to the plural detecting signals.

Another embodiment of the disclosure provides a bend sensing method for a flexible display panel. The flexible display panel includes plural detecting electrodes. The plural detecting electrodes generate plural detecting signals according to a change of an electric field or a magnetic field. Firstly, a status change event is generated according to plural detecting signals. Then, judge whether a bending event is generated according to a relationship between the plural detecting signals. Afterwards, a corresponding control action is performed.

A further embodiment of the disclosure provides a bend sensing system for a flexible display panel. The bend sensing system includes a touch panel and a controlling circuit. The touch panel is attached on the flexible display panel. Plural detecting electrodes are disposed on the touch panel. The plural detecting electrodes generate plural detecting signals according to a change of an electric field or a magnetic field. The controlling circuit receives the plural detecting signals and generates a status change event according to plural detecting signals. After the status change event is generated, the controlling circuit judges whether a bending event is generated according to a relationship between the plural detecting signals.

Numerous objects and features of the disclosure will be readily apparent upon a reading of the following detailed description of embodiments of the disclosure when taken in conjunction with the accompanying drawings. However, the drawings employed herein are for the purpose of descriptions and should not be regarded as limiting.

BRIEF DESCRIPTION OF THE DRAWINGS

The above objects of the disclosure will become more readily after reviewing the following detailed description and accompanying drawings, in which:

FIGS. 3A~3E are plots illustrating the relationship between the detecting electrodes and intensities of detecting signals in different operating conditions;

FIGS. 4A~4C schematically illustrate a flowchart of a bend sensing method for a flexible display panel according to an embodiment of the disclosure;

DETAILED DESCRIPTION

Figure 1A:
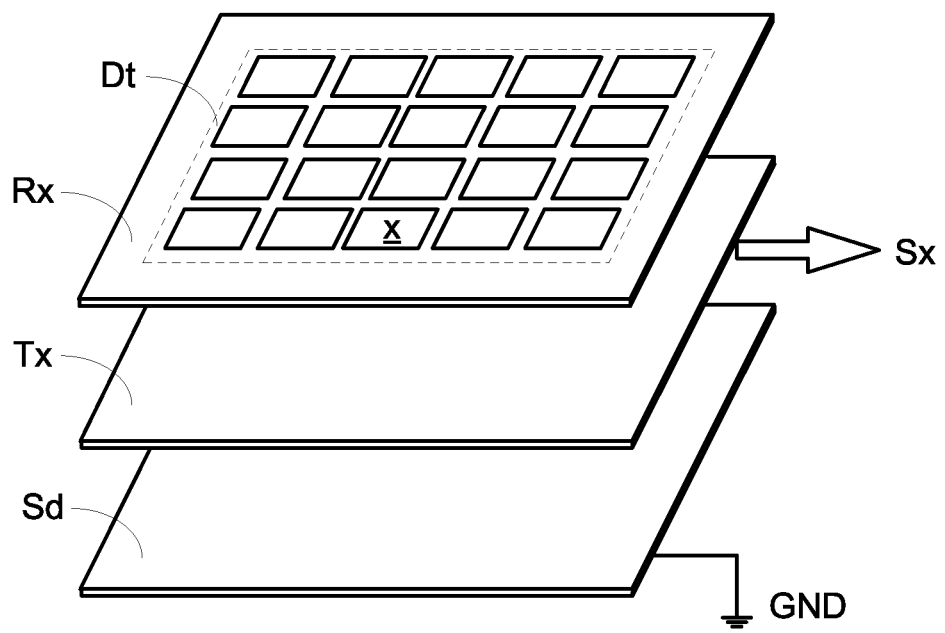
FIG. 1A is a schematic exploded view illustrating a capacitive touch panel.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
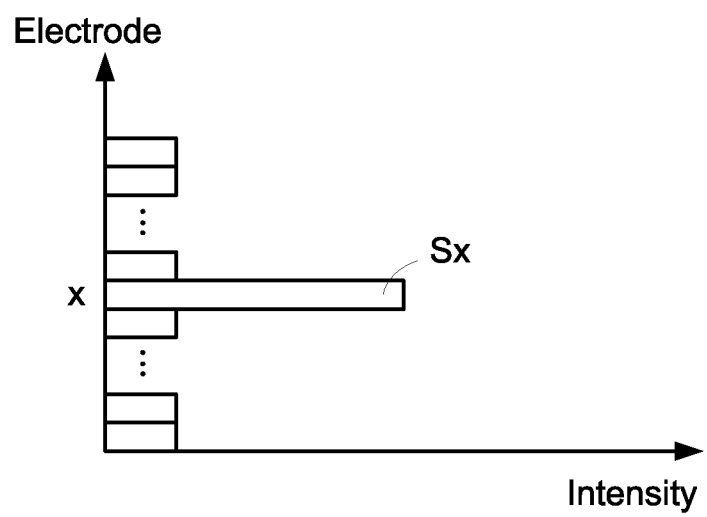
FIG. 1B is a plot illustrating the relationship between the detecting electrodes and intensities of detecting signals.

FIG. 1A is a schematic exploded view illustrating a capacitive touch panel. FIG. 1B is a plot illustrating the relationship between the detecting electrodes and intensities of detecting signals. As shown in FIG. 1, the touch panel comprises a receiver layer Rx, a transmitter layer Tx, and a shielding layer Sd. The shielding layer Sd is connected to a ground terminal GND. Moreover, plural detecting electrodes are disposed on a touch sensing zone Dt of the receiver layer Rx. For example, the plural detecting electrodes are indium tin oxide (ITO) films. When the user generates plural touch points on the touch sensing zone Dt of the touch panel, the electric fields or the magnetic fields of the detecting electrodes at or around the touch points are subjected to change. Consequently, the mutual capacitance values of the detecting electrodes and the corresponding detecting signals are changed. The detecting electrode is made of copper foil, nano silver wire or silicon-based semiconductor material.

As shown in FIG. 1B, the touch point is at the detecting electrode x. Consequently, the electric field or the magnetic field around the detecting electrode x is subjected to change. Since the mutual capacitance value of the detecting electrode is changed, the intensity of the x-th position detecting signal Sx corresponding to the detecting electrode x is also changed. When the detecting signals of all detecting electrodes are transmitted from the transmitter layer Tx to a back-end controlling circuit (not shown), the transmitter layer Tx may judge all of the detecting signals and realize the intensity change of the x-th position detecting signal Sx. Consequently, the controlling circuit may confirm that the touch point is at the detecting electrode x. Generally, the intensity change of the detecting signal denotes the voltage amplitude change or the electric field intensity change or the magnetic intensity change.

In accordance with the disclosure, plural detecting electrodes are installed on the touch panel as bend sensors, and the bend sensors are applied to a flexible display panel. During the process of bending the flexible display panel, the bend sensors may detect the change of the electric field or the magnetic field around the detecting electrodes and correspondingly generate detecting signals. After the detecting signals are received by the back-end controlling circuit (not shown), the controlling circuit may judge whether touch events or bending events are generated by the user. In accordance with the disclosure, the touch panel is attached on a flexible display panel. When the flexible display panel is bent, the touch panel is correspondingly bent. Moreover, the detecting electrodes on the touch panel have both of the touch sensing function and the bend sensing function. For clarification and brevity, the receiver layer Rx of the touch panel will be illustrated.

Figure 2:
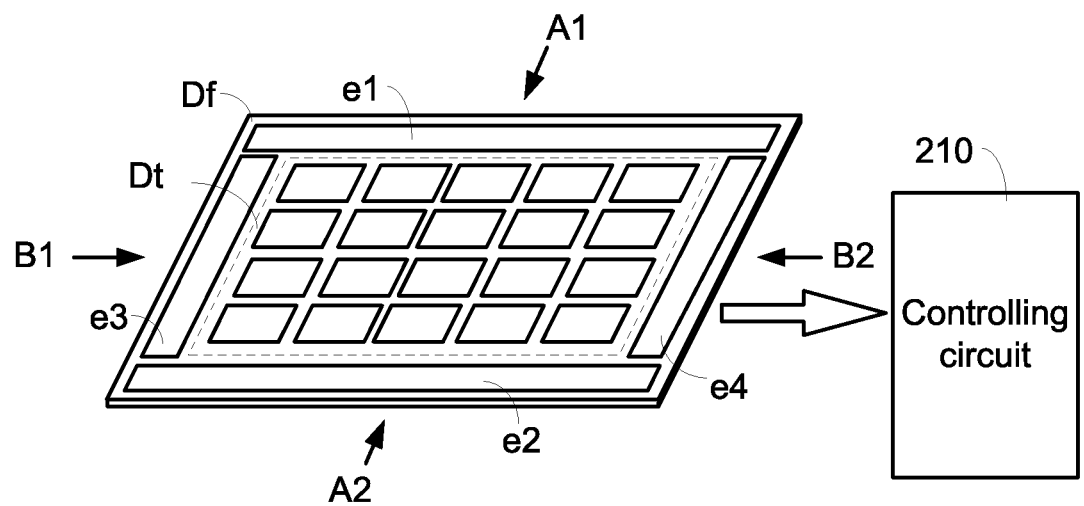
FIG. 2 schematically illustrates a touch panel according to a first embodiment of the disclosure.

FIG. 2 schematically illustrates a touch panel according to a first embodiment of the disclosure. The touch panel is attached on a flexible display panel. The touch panel comprises a touch sensing zone Dt and a bend sensing zone Df. The touch sensing zone Dt is located at a middle region of the touch panel. The bend sensing zone Df is located at a peripheral region of the touch panel. Moreover, the touch sensing zone Dt comprises plural detecting electrodes, and the bend sensing zone Df comprises four detecting electrodes e1~e4. In this embodiment, the detecting electrodes are indium tin oxide (ITO) films. The detecting electrodes in the bend sensing zone are used as bend sensors. The touch panel along with the flexible display panel may be bent relative to the line A1-A2 or the line B1-B2.

When the user generates plural touch points on the touch sensing zone Dt of the touch panel, the electric fields or the magnetic fields of the detecting electrodes at or around the touch points are subjected to change. Consequently, the mutual capacitance values of the detecting electrodes and the corresponding detecting signals are changed. Moreover, when the touch points are generated, since the electric fields or the magnetic fields of the detecting electrodes at or around the touch points are subjected to change, the detecting signals corresponding to the four detecting electrodes e1~e4 of the bend sensing zone Df are also changed. Moreover, all of the detecting signals are received by a back-end controlling circuit 210, the controlling circuit 210 may judge whether touch events or bending events are generated by the user.

FIGS. 3A~3E are plots illustrating the relationship between the detecting electrodes and intensities of detecting signals in different operating conditions.

Figure 3A:
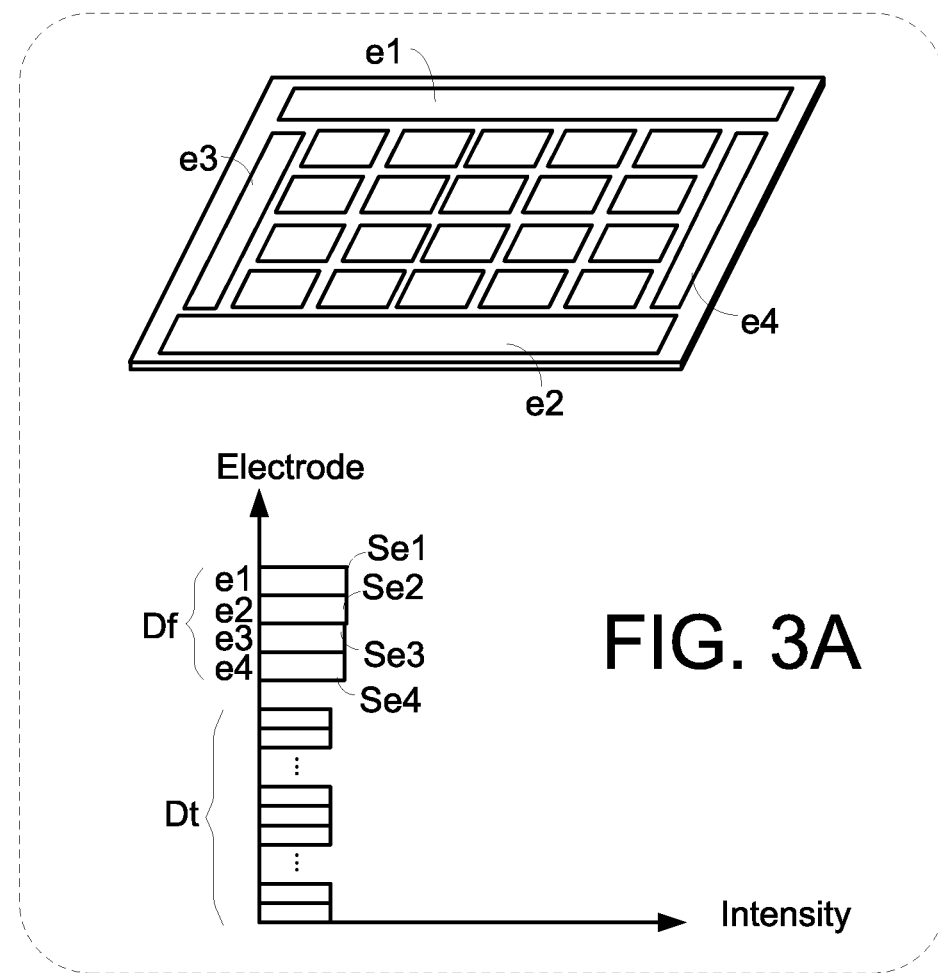

As shown in FIG. 3A, no touch point is generated by the touch panel, and the touch panel is not bent. Under this circumstance, the detecting electrodes of the touch sensing zone Dt and the bend sensing zone Df do not sense the change of the electric field or the magnetic field. Consequently, the intensities of the detecting signals generated by the touch sensing zone Dt and the intensities of the detecting signals Se1~Se4 generated by the bend sensing zone Df are all very small.

As shown in FIG. 3B, the detecting electrode x is the touch point. Under this circumstance, since the electric field or the magnetic field of the detecting electrode x is subjected to change, intensity of the x-th position detecting signal Sx corresponding to the detecting electrode x is also subjected to change. Moreover, since the touch point is closer to the second detecting electrode e2 and farther from the first detecting electrode e1, the intensity of the second detecting signal Se2 is higher than the first detecting signal Se1. Since the distance between the touch point and the third detecting electrode e3 is approximately equal to the distance between the touch point and the fourth detecting electrode e4, the intensity of the third detecting signal Se3 is substantially equal to the fourth detecting signal Se4.

As shown in FIG. 3B, the detecting electrode y is the touch point. Under this circumstance, since the electric field or the magnetic field of the detecting electrode y is subjected to change, intensity of the y-th position detecting signal Sy corresponding to the detecting electrode y is also subjected to change. Moreover, since the touch point is closer to the second detecting electrode e2 and the third detecting electrode e3, the intensities of the second detecting signal Se2 and the third detecting signal Se3 are higher, and the intensities of the first detecting signal Se1 and the fourth detecting signal Se4 are lower.

From the above discussions, when the user generates a touch points on the touch sensing zone Dt, the intensity of the detecting signal corresponding to the touch point is higher. Moreover, the intensities of the detecting signals Se1~Se4 are determined according to the position of the touch point. Meanwhile, the detecting electrodes e1~e4 of the touch sensing zone Dt may be used to assist in positioning the touch point.

Figure 3D:
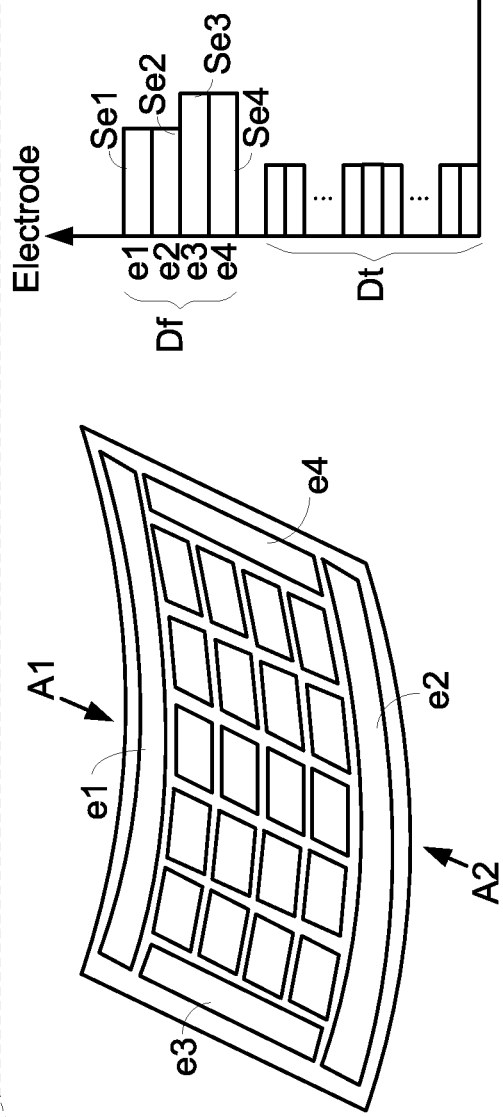

As shown in FIG. 3D, the touch panel is bent relative to the line A1-A2 and the curvature radius is larger. Since no touch point is generated, the intensities of the detecting signals generated by all detecting electrodes of the touch sensing zone Dt are low and substantially equal. Since the curvature radius is larger, the bending degree of the touch panel is not very serious, and the intensity changes of the detecting signals caused by the electric field changes or the magnetic field changes are also very low. After the first detecting electrode e1 and the second detecting electrode e2 are bent, the distances between the first detecting electrode e1 (or the second detecting electrode e2) and other detecting are not obviously changed (see FIG. 3D). Consequently, the first detecting signal Se1 and the second detecting signal Se2 are not obviously changed, and the first detecting signal Se1 and the second detecting signal Se2 are substantially equal. After the third detecting electrode e3 and the fourth detecting electrode e4 are bent, the distance between the third detecting electrode e3 and the fourth detecting electrode e4 is reduced. Consequently, the intensities of the third detecting signal Se3 and the fourth detecting signal Se4 are increased. Moreover, since the bending line is the central line, the intensities of the third detecting signal Se3 and the fourth detecting signal Se4 are substantially equal. In other words, the intensities of the first detecting signal Se1 and the second detecting signal Se2 are lower than the intensities of the third detecting signal Se3 and the fourth detecting signal Se4.

Figure 3E:
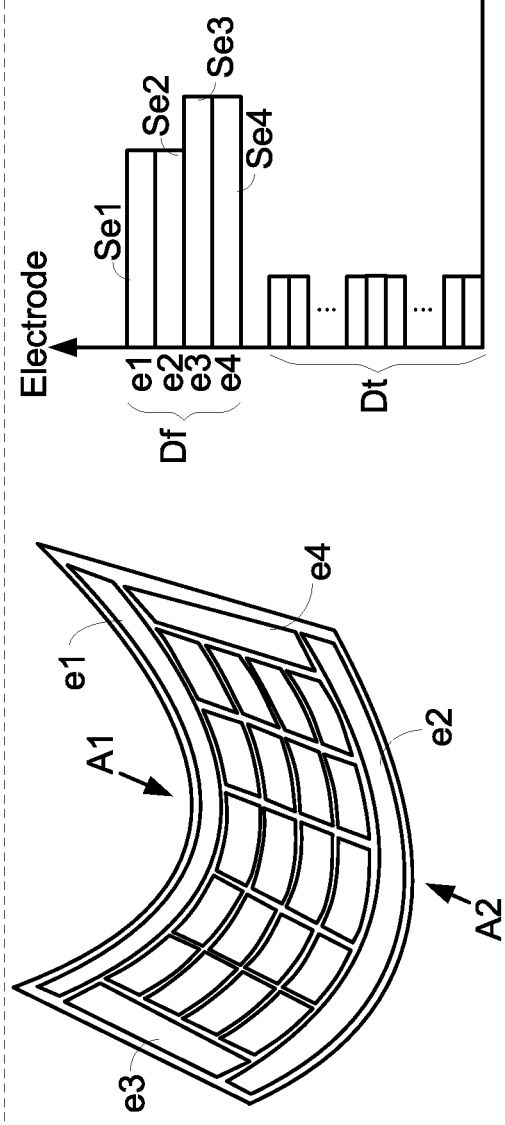

As shown in FIG. 3E, the touch panel is bent relative to the line A1-A2 and the curvature radius is smaller. Since no touch point is generated, the intensities of the detecting signals generated by all detecting electrodes of the touch sensing zone Dt are low and substantially equal. Since the curvature radius is smaller, the bending degree of the touch panel is very serious. In comparison with FIG. 3D, the distance between the third detecting electrode e3 and the fourth detecting electrode e4 is shorter. Consequently, the intensity changes of the detecting signals caused by the electric field changes or the magnetic field changes are larger. After the first detecting electrode e1 and the second detecting electrode e2 are bent, the distances between the first detecting electrode e1 (or the second detecting electrode e2) and other detecting are not obviously changed (see FIG. 3E). Consequently, the first detecting signal Se1 and the second detecting signal Se2 are not obviously changed, and the first detecting signal Se1 and the second detecting signal Se2 are substantially equal. After the third detecting electrode e3 and the fourth detecting electrode e4 are bent, the distance between the third detecting electrode e3 and the fourth detecting electrode e4 is reduced. Consequently, the intensities of the third detecting signal Se3 and the fourth detecting signal Se4 are increased. Moreover, since the bending line is the central line, the intensities of the third detecting signal Se3 and the fourth detecting signal Se4 are substantially equal.

Similarly, when the touch panel is bent relative to the line B1-B2, the intensities of the corresponding detecting signals are equal because the line B1-B2 is the central line. Moreover, when the touch panel is bent relative to the line B1-B2, the intensity of the first detecting signal Se1 is higher than the intensity of the third detecting signal Se3.

From the above discussions, if a touch point on the touch panel is generated and the touch panel is not bent, the intensity of the detecting signal corresponding to a specified position of the touch sensing zone Dt is increased. Moreover, the detecting signals Se1~Se4 generated by the bend sensing zone Df are not symmetrical to each other. Moreover, if no touch point is generated by the touch panel and the touch panel is bent, the intensities of the detecting signals generated by the touch sensing zone Dt are lower, and the detecting signals Se1~Se4 generated by the bend sensing zone Df are symmetrical to each other.

FIGS. 4A~4C schematically illustrate a flowchart of a bend sensing method for a flexible display panel according to an embodiment of the disclosure. The bend sensing method may be applied to the touch panel of FIG. 2. By the bend sensing method, the controlling circuit 210 may judge whether touch events or bending events are generated by the user.

Please refer to FIG. 4A. Firstly, the controlling circuit 210 generates a status change event according to plural detecting signals (Step S410). Then, the controlling circuit 210 judges whether a touch event or a bending event is generated according to the relationship between the plural detecting signals (Step S420). Then, the controlling circuit 210 performs a corresponding control action (Step S430). Then, the step S410 is repeatedly done.

The detailed procedures of the step S430 are shown in FIG. 4C. If the controlling circuit 210 judges that the touch event is generated (Step S432), the touch event is triggered (Step S434). For example, a touch point is determined according to the intensities of these detecting signals. Whereas, if the controlling circuit 210 judges that the bending event is generated (Step S432), the bending event is triggered (Step S436). Consequently, the bending situation of the flexible display panel is realized, and then a count value of a bend counter is added by 1 (Step S4338). The bend counter may be built in the controlling circuit 210. Alternatively, the bend counter is an independent counter disposed outside the controlling circuit 210. The bend counter may be used to record a display parameter or a sensing parameter of the flexible display panel.

For dynamically detecting the status of the touch panel, the controlling circuit 210, the step S410 comprises a step of normalizing the detecting signals (Step S412) and a step of judging whether the status change event needs to be generated (Step S414). If no status change event is generated, the step S414 is repeatedly done. Whereas, if the status change event is generated, the status change event is generated (Step 416). In the step S412, the step of normalizing the detecting signals denotes a procedure of initializing or standardizing the detecting signals.

In the step S420 and the step S430, the controlling circuit 210 judges whether the touch panel generates the touch event or the bending event according to the relationship between the plural detecting signals as shown in FIGS. 3A~3E. Of course, the bending situation of the touch panel may be determined by the controlling circuit 210 according to the relationship between the detecting signals generated by the bend sensing zone Df.

For example, if the intensity of the x-th position detecting signal Sx is increased and the detecting signals Se1~Se4 generated by the bend sensing zone Df are not symmetrical to each other, the controlling circuit 210 judges that the touch event is generated and realizes that the touch point is at the detecting electrode x of the touch sensing zone Dt. Moreover, if the intensities of the detecting signals generated by the touch sensing zone Dt are all lower than a first threshold value and the intensities of the detecting signals Se1~Se4 generated by the bend sensing zone Df are all higher than a second threshold value and symmetrical to each other, the controlling circuit 210 judges that the bending event is generated. Under this circumstance, the controlling circuit 210 will increase the count value of the bend counter by 1, and the number of times the flexible display panel is bent will be accumulated. Moreover, if the intensities of the detecting signals generated by the touch sensing zone Dt are all lower than the first threshold value and the intensities of the detecting signals Se1~Se4 generated by the bend sensing zone Df are all lower than the second threshold value, the controlling circuit 210 judges that no touch point is generated by the touch panel and the touch panel is not bent.

In some embodiments, the controlling circuit 210 may realize the bending direction of the flexible display panel according to the relationship between a first pair of detecting signals Se1 and Se2 and a second pair of detecting signals Se3 and Se4. For example, if the intensity of the first detecting signal Se1 is lower than the intensity of the third detecting signal Se3, the controlling circuit 210 judges that the flexible display panel is bent relative to the line A1-A2. Whereas, if the intensity of the first detecting signal Se1 is higher than the intensity of the third detecting signal Se3, the controlling circuit 210 judges that the flexible display panel is bent relative to the line B1-B2.

Figures 5A, 5B:
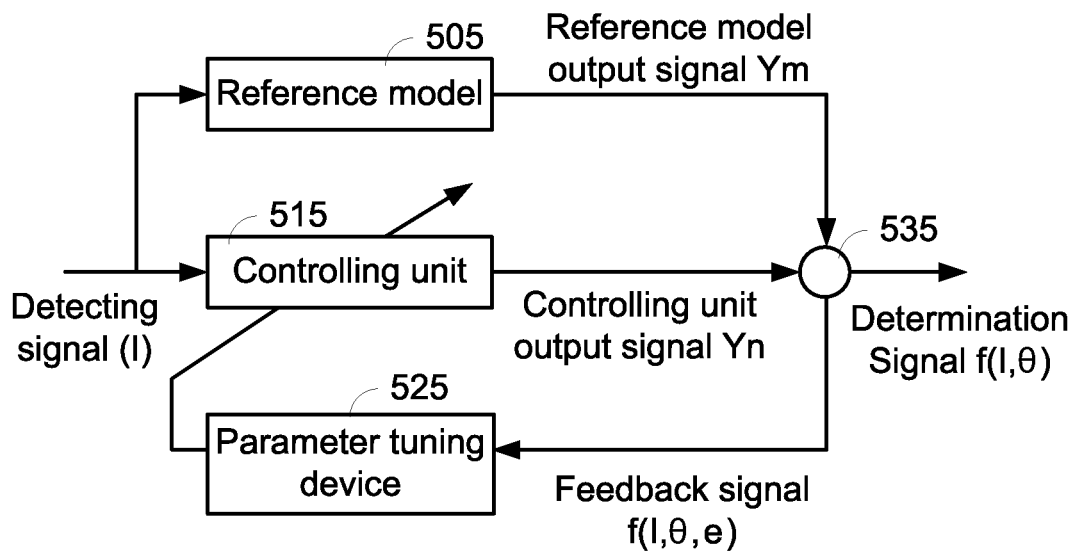
FIG. 5A is a look-up table illustrating the relationships between the detecting signals and the bending direction/angle.
FIG. 5B is a schematic functional block diagram illustrating a systematic close-loop circuit according to an embodiment of the disclosure.

The step S430 may be implemented by other approaches. For example, a look-up table may be used to determine a bending direction and a bending angle κ. FIG. 5A is a look-up table illustrating the relationships between the detecting signals and the bending direction/angle. The signal Sdt denotes the intensity of any detecting signal generated by the touch sensing zone Dt or the average intensity of the detecting signals generated by the touch sensing zone Dt. According to the correlative relationship of the look-up table, these detecting signals may be correlated with the bending direction or the bending angle.

In this embodiment, a direction/angle look-up table is previously established by the controlling circuit 210. According to the look-up table, the controlling circuit 210 may realize the bending direction and the bending angle of the flexible display panel. Please refer to FIG. 5A. In case that the intensities of the first detecting signal Se1, the second detecting signal Se2, the detecting signal Sdt, the third detecting signal Se3 and the fourth detecting signal Se4 are respectively $I(0,0)$, $I(0,1)$, $I(0,2)$, $I(0,3)$ and $I(0,4)$, the controlling circuit 210 judges that the bending direction of the flexible display panel is D1 and the bending angle of the flexible display panel is θ0. In case that the intensities of the first detecting signal Se1, the second detecting signal Se2, the detecting signal Sdt, the third detecting signal Se3 and the fourth detecting signal Se4 are respectively $I(12,0)$, $I(12,1)$, $I(12,2)$, $I(12,3)$ and $I(12,4)$, the controlling circuit 210 judges that the bending direction of the flexible display panel is D2 and the bending angle of the flexible display panel is θ2. The rest may be deduced by analogy.

In other words, after the intensities of the detecting signals generated by the touch sensing zone Dt or the intensities of the detecting signals Se1~Se4 generated by the touch sensing zone Dt are obtained, the bending direction and the bending angle of the flexible display panel are determined by the controlling circuit 210 according to the correlative relationship of the direction/angle look-up table.

In addition to the look-up table of FIG. 5A, a systematic close-loop circuit may be used to acquire the bending direction and the bending angle of the flexible display panel. FIG. 5B is a schematic functional block diagram illustrating a systematic close-loop circuit according to an embodiment of the disclosure. As shown in FIG. 5B, the systematic close-loop circuit comprises a reference model 505, a controlling unit 515, a parameter tuning device 525, and a convolution unit 535. The reference model 505 is used for planning the performance of the systematic close-loop circuit, so that the reference model 505 is a response element for achieving ideal output. The systematic bending characteristics are all stored in the reference model 505. Moreover, the reference model 505 may perform a feedback control according to the matched and planned bending characteristics. The controlling unit 515 is a feedback controlling element with an adjustable parameter. The parameter tuning device 525 may adjust a control parameter of the controlling unit 515 according to a tracking error between the systematic output and the reference model. Consequently, even if the systematic parameter is unknown, the tracking error may be converged to zero.

Please refer to FIG. 5B. After all detecting signals I generated by the detecting electrodes are inputted into the reference model 505, the reference model 505 generates a reference mode output signal Ym. After all detecting signals I generated by the detecting electrodes are inputted into the controlling unit 515, the controlling unit 515 generates a controlling unit output signal Yn. After the reference mode output signal Ym and the controlling unit output signal Yn are received by the convolution unit 535, the convolution unit 535 generates a determination signal $f(I, \theta)$ and a feedback signal $f(I, \theta, e)$. Moreover, according to the feedback signal $f(I, \theta, e)$, the parameter tuning device 525 adjusts the control parameter of the controlling unit 515 and updates the controlling unit output signal Yn. Consequently, the determination signal $f(I, \theta)$ outputted from the systematic close-loop circuit denotes the bending direction and the bending angle of the flexible display panel.

In addition to the two bending direction as shown in FIG. 2, the touch panel of the disclosure may be bent along more bending directions.

Figure 6A:
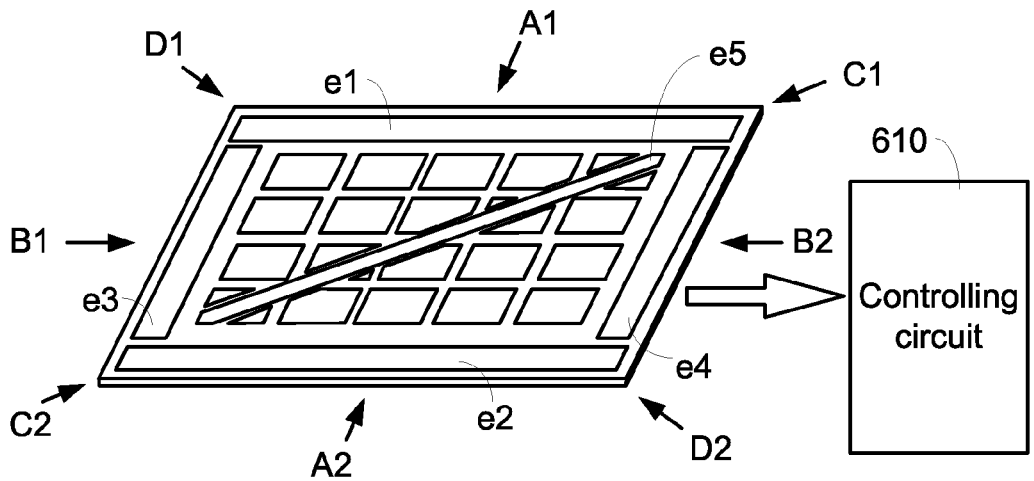
FIG. 6A schematically illustrates a touch panel according to a second embodiment of the disclosure.

FIG. 6A schematically illustrates a touch panel according to a second embodiment of the disclosure. The touch panel is attached on a flexible display panel. Moreover, the touch panel comprises five detecting electrodes e1~e5. In this embodiment, the detecting electrodes are indium tin oxide (ITO) films. The structures and operating principles of the detecting electrodes e1~e4 are similar to those of the first embodiment, and are not redundantly described herein. In comparison with the first embodiment, the touch panel of this embodiment further comprises the fifth detecting electrode e5. The fifth detecting electrode e5 is arranged along a diagonal line of the touch panel.

In this embodiment, the touch panel may be bent relative to the line A1-A2 or the line B1-B2. Moreover, the touch panel may be bent relative to a line C1-C2 or a line D1-D2. In other words, the bending status along the diagonal lines of the touch panel may be detected. Hereinafter, a method of detecting the change of the detecting signals in response to the bending action along the line C1-C2 or the line D1-D2 will be illustrated.

Figure 6B:
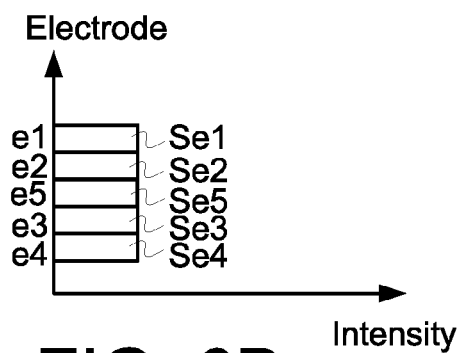
FIGS. 6B~6D are plots illustrating the relationship between the detecting electrodes and intensities of detecting signals in different operating conditions.
Figure 6C:
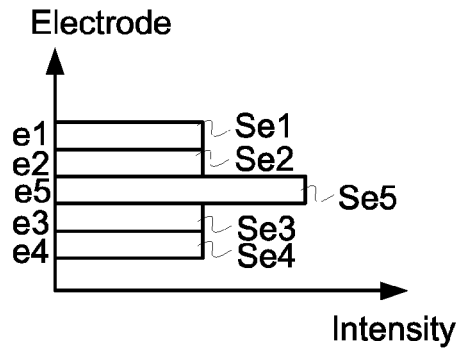
Figure 6D:
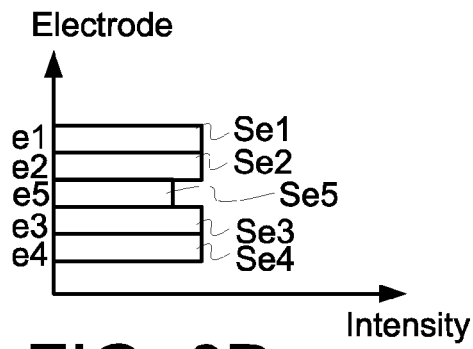

FIGS. 6B~6D are plots illustrating the relationship between the detecting electrodes and intensities of detecting signals in different operating conditions. As shown in FIG. 6B, no touch point is generated by the touch panel, and the touch panel is not bent. Under this circumstance, the detecting electrodes e1~e5 do not sense the change of the electric field or the magnetic field. Consequently, the intensities of the detecting signals Se1-Se5 are all very small.

As shown in FIG. 6C, the touch panel is bent relative to the line D1-D2. Under this circumstance, the first detecting electrode e1 is close to the third detecting electrode e3, and the second detecting electrode e2 is close to the fourth detecting electrode e4. Consequently, the intensities of the four detecting signals Se1~Se4 are substantially equal. Moreover, during the process of bending the fifth detecting electrode e5, the intensity of the fifth detecting signal Se5 caused by the electric field or the magnetic field is higher.

As shown in FIG. 6D, the touch panel is bent relative to the line C1-C2. Under this circumstance, the first detecting electrode e1 is close to the fourth detecting electrode e4, and the second detecting electrode e2 is close to the third detecting electrode e3. Consequently, the intensities of the four detecting signals Se1~Se4 are substantially equal. Moreover, during the process of bending the fifth detecting electrode e5, the intensity of the fifth detecting signal Se5 caused by the electric field or the magnetic field is lower.

From the above discussions, during the process of bending the touch panel of the second embodiment, the controlling circuit 610 may judge whether a bending event is generated by the touch panel according to the five detecting signals Se1-Se5 and realize the bending direction of the touch panel. Moreover, a look-up table similar to that of FIG. 5A may be used to determine a bending direction and a bending angle θ of the touch panel. Moreover, a systematic close-loop circuit similar to that of FIG. 5B may be used to determine the bending direction and the bending angle θ of the touch panel. The ways of determining the bending direction and the bending angle θ by the look-up table or the systematic close-loop circuit are similar to those of the first embodiment, and are not redundantly described herein.

Moreover, for bending the touch panel along more directions, the arrangement of the detecting electrodes may be modified. FIGS. 7A-7D schematically illustrate some arrangements of the detecting electrodes of the touch panel of the disclosure.

Figure 7A:
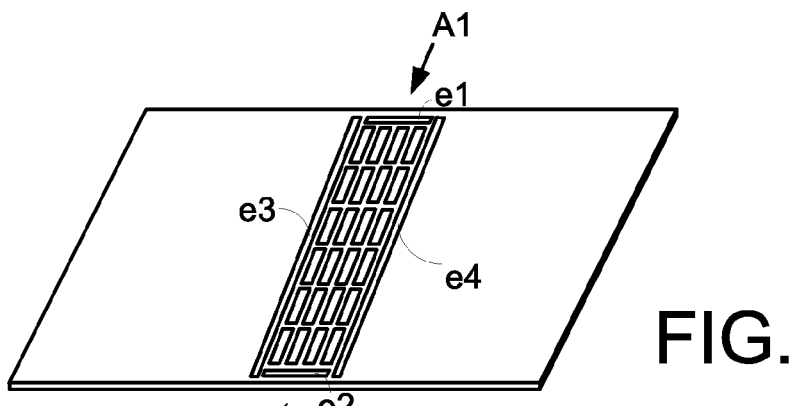
FIGS. 7A~7D schematically illustrate some arrangements of the detecting electrodes of the touch panel of the disclosure.

As shown in FIG. 7A, the detecting electrodes are located near the rotating axis. When the touch panel is bent relative to the line A1-A2, the electric field changes or the magnetic field changes of the detecting electrodes e3 and e4 are higher. Consequently, the intensities of the detecting signals Se3 and Se4 are also higher.

Figure 7B:
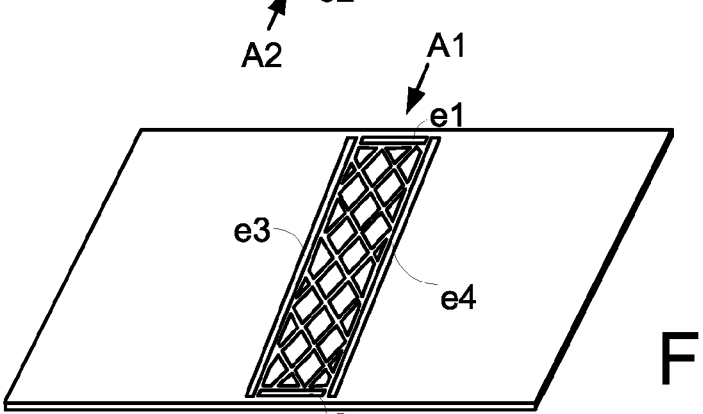
Figure 7C:
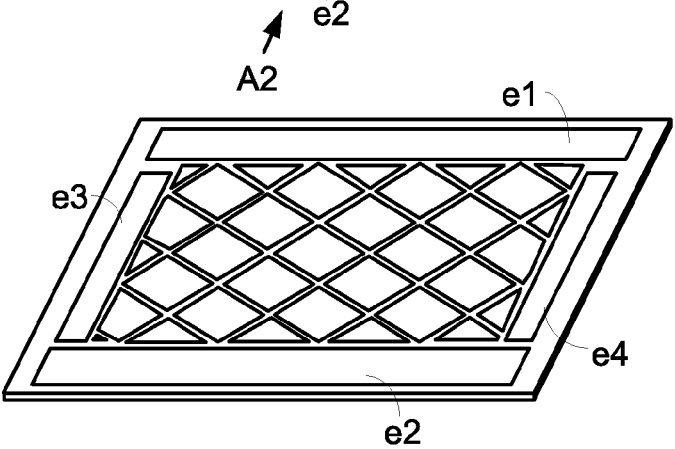

As shown in FIG. 7A, the detecting electrodes in the middle region are arranged like a checker board. Moreover, as shown in FIG. 7B, the detecting electrodes in the middle region have rhombus profiles. Alternatively, only the detecting electrodes e1~e4 are used as bend sensors. The structure of the touch panel of FIG. 7C is similar to that of the first embodiment, wherein the detecting electrodes in the middle region have rhombus profiles.

Figure 7D:
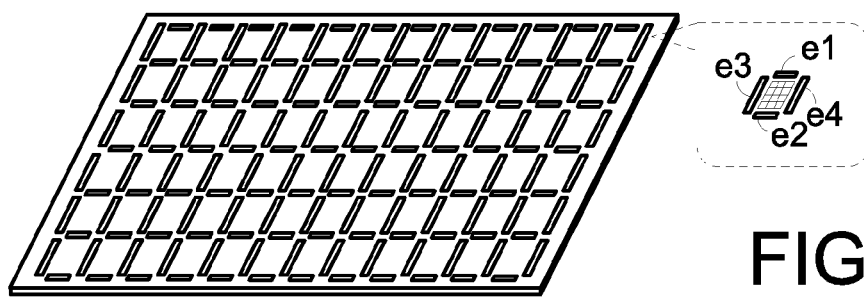

In case that the display panel is only permitted to be bent relative to one or more fixed rotating axes, the display panel is referred as a foldable display panel. In case that the entire surface of the display panel can be arbitrarily bent, the display panel is referred as a flexible display panel, and the precisions of the bending direction and the bending angle are increased. As shown in FIG. 7D, the plural detecting electrode groups are distributed over the entire of the display panel. Each detecting electrode group comprises four electrodes e1~e4, wherein the area of the detecting electrode group is larger than one pixel. The arrangement of the plural detecting electrode groups may be varied according to the precision requirement of the system.

Figure 8:
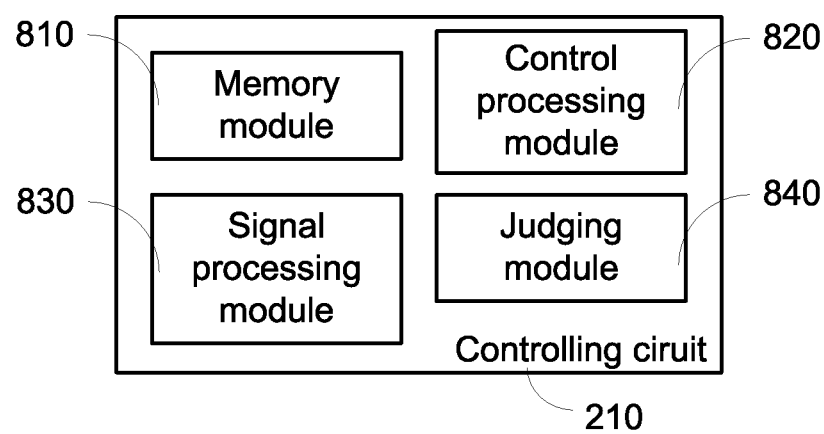
FIG. 8 is a schematic functional block diagram illustrating the controlling circuit of the touch panel of the disclosure.

FIG. 8 is a schematic functional block diagram illustrating the controlling unit of the touch panel of the disclosure. As shown in FIG. 8, the controlling circuit 210 comprises a memory module 810, a control processing module 820, a signal processing module 830, and a judging module 840. The bend sensing method of FIGS. 4A~4C may be implemented by the controlling circuit 210. Of course, the controlling circuit 210 may be applied to the flexible display panel and the bend sensing method of the disclosure.

Figure 9:
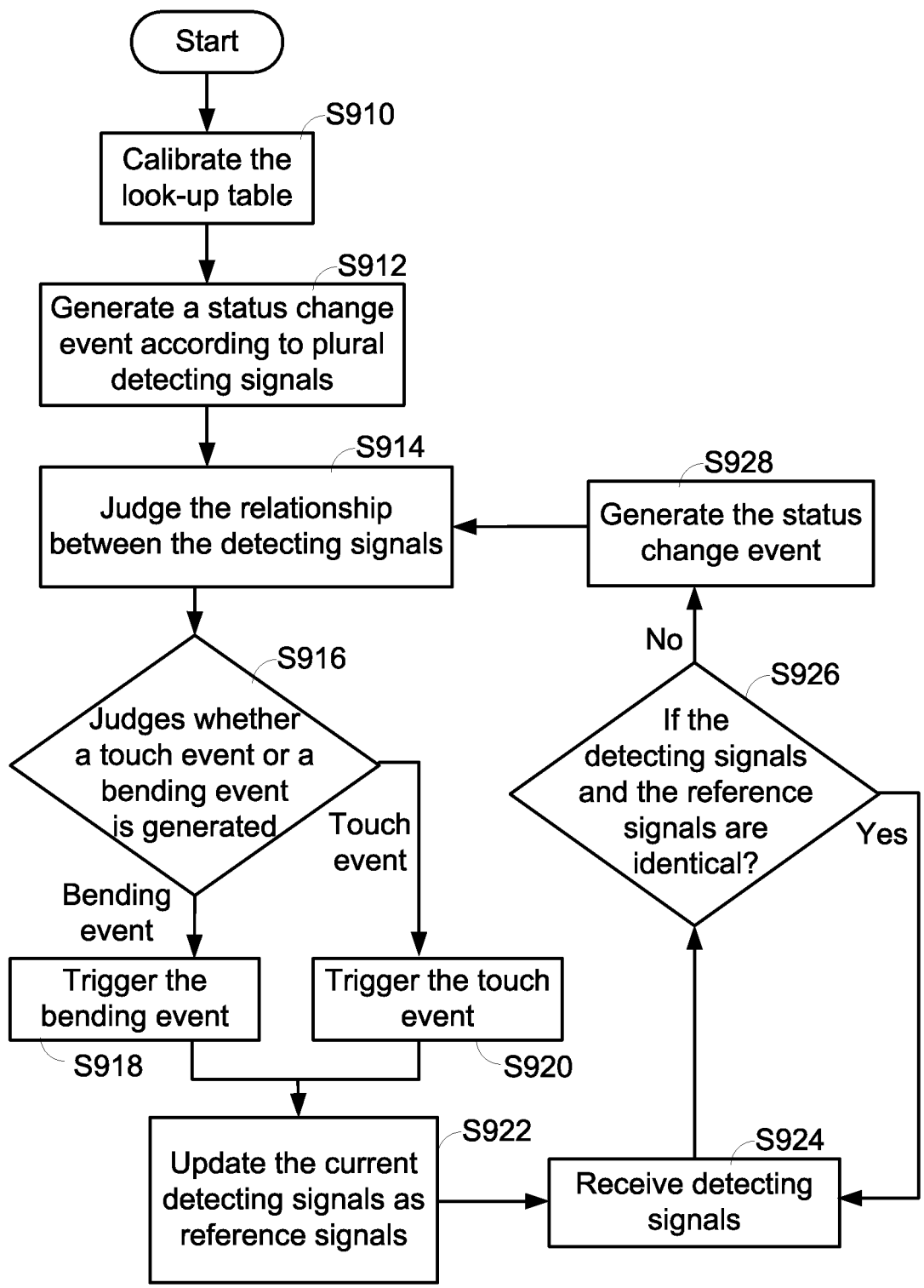
FIG. 9 schematically illustrates a flowchart of a bend sensing method for a flexible display panel with the detecting electrode arrangement of FIG. 7D and the controlling circuit of FIG. 8.

FIG. 9 schematically illustrates a flowchart of a bend sensing method for a flexible display panel with the detecting electrode arrangement of FIG. 7D and the controlling circuit of FIG. 8.

Firstly, after the flexible display panel is turned on, the controlling circuit 210 calibrates the look-up table (Step S910). The look-up table is stored in the memory module 810. Moreover, the look-up table may be stored in the memory module 810 after the look-up table is off-line tested. When the flexible display panel is turned on, the procedure of calibrating the look-up table is performed to minimize the influence of the environmental noise. It is noted that the step S910 may be omitted. That is, the look-up table in the memory module 810 may be directly used.

Then, the control processing module 820 generates a status change event according to plural detecting signals (Step S912). The detecting signals received by the detecting electrodes are processed by the signal processing module 830. For example, the analog signals received by the detecting electrodes may be converted into digital signals, and the digital signals are then normalized.

Then, the judging module 840 judges the relationship between the detecting signals (Step S914). In this step, the processed detecting signals are compared with the look-up table. According to the relationship between the detecting signals, the judging module 840 judges a touch event or a bending event is generated (Step S916).

If the judging module 840 judges that the bending event is generated, the bending event is transmitted to the control processing module 820 (Step S918). Meanwhile, the information about the bending direction and the bending angle is transmitted from the judging module 840 to the control processing module 820. According to the information, the control processing module 820 performs the subsequent actions.

On the other hand, if the judging module 840 judges that the touch event is generated, the touch event is transmitted to the control processing module 820 (Step S920). Meanwhile, the information about the touch point is transmitted from the judging module 840 to the control processing module 820. According to the information, the control processing module 820 performs the subsequent actions.

Then, the current detecting signals are updated as reference signals by the control processing module 820 (Step S922). The reference signals are also stored in the memory module 810.

Then, the detecting signals are continuously received by the control processing module 820 (Step S924). The judging module 840 continuously judges whether the reference signals and the detecting signals are identical (Step S926). If the reference signals and the detecting signals are identical, the step S924 is repeatedly done. Whereas, if the reference signals and the detecting signals are not identical, the status change event is generated (Step S928), and the step S914 is repeatedly done.

From the above descriptions, the disclosure provides a bend sensor and a bend sensing method for a flexible display panel. In the disclosure, plural detecting electrodes are disposed on a touch panel and used as the bend sensor. During the process of bending the flexible display panel, the electric field or the magnetic field of the flexible display panel is subjected to change. Consequently, plural detecting signals are generated by the plural detecting electrodes. According to the plural detecting signals, the back-end controlling circuit may realize the bending status of the flexible display panel. The bending status of the flexible display panel includes the bending direction or the bending angle.

It is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flexible display panel, comprising:
   a touch panel having a receiver layer;
   plural detecting electrodes disposed on the receiver layer, wherein a first portion of the plural detecting electrodes is disposed on a touch sensing zone of the receiver layer and a second portion of the plural detecting electrodes is disposed on a bend sensing zone of the receiver layer, wherein the second portion of the plural detecting electrodes comprises a pair of parallel detecting electrodes, and wherein each of the plural detecting electrodes generates a respective corresponding one of plural detecting signals according to a change of an electric field or a magnetic field; and
   a controlling circuit for receiving the plural detecting signals and judging a bending status of the flexible display panel according to the plural detecting signals;
   wherein the first portion of the plural detecting electrodes and the second portion of the plural detecting electrodes are disposed on a same side of the receiver layer, and
   wherein
      when the intensity of one of the detecting signals corresponding to the first portion of the detecting electrodes is higher than the intensities of the other detecting signals corresponding to the first portion of the detecting electrodes and the intensities of the detecting signals corresponding to the pair of parallel detecting electrodes are not symmetrical to each other, a touch event is determined by the controlling circuit, and
      when the intensities of the detecting signals corresponding to the pair of parallel detecting electrodes increase, the intensities of the detecting signals corresponding to the pair of parallel detecting electrodes are higher than the intensities of the detecting signals corresponding to the first portion of the detecting electrodes, and the intensities of the detecting signals corresponding to the pair of parallel detecting electrodes are symmetrical, a bending event is determined by the controlling circuit.

2. The flexible display panel as claimed in claim 1, wherein the plural detecting electrodes are made of indium tin oxide, copper foil, nano silver wire or semiconductor material.

3. The flexible display panel as claimed in claim 1, wherein when the controlling circuit judges that the touch event is generated, a touch point is determined by the controlling circuit according to the plural detecting signals.

4. The flexible display panel as claimed in claim 1, wherein when the controlling circuit judges that the bending event is generated, the controlling circuit increases a count value of a bend counter by 1.

5. The flexible display panel as claimed in claim 1, wherein a bending direction or a bending angle of the flexible display panel is determined by the controlling circuit according to the plural detecting signals.

6. The flexible display panel as claimed in claim 5, wherein the plural detecting signals are correlated with the bending direction or the bending angle by the controlling circuit according to a correlative relationship.

7. The flexible display panel as claimed in claim 6, wherein the correlative relationship is obtained by use of a look-up table.

8. The flexible display panel as claimed in claim 6, wherein the correlative relationship is obtained by a systematic close-loop circuit.

9. A bend sensing method for a flexible display panel, the flexible display panel comprising plural detecting electrodes disposed on a receiver layer and a first portion of the plural detecting electrodes disposed on a touch sensing zone of the receiver layer and a second portion of the plural detecting electrodes disposed on a bend sensing zone of the receiver layer, wherein the second portion of the plural detecting electrodes comprises a pair of parallel detecting electrodes, the plural detecting electrodes each generating a respective corresponding one of plural detecting signals according to a change of an electric field or a magnetic field, the bend sensing method comprising steps of:
   (a) generating a status change event according to plural detecting signals;
   (b) judging whether a bending event or a touch event is generated according to a relationship between the plural detecting signals; and
   (c) performing a corresponding control action;
   wherein when the intensity of one of the detecting signals corresponding to the first portion of the detecting electrodes is higher than the intensities of the other detecting signals corresponding to the first portion of the detecting electrodes and the intensities of detecting signals corresponding to the second portion are not symmetrical to each other, the touch event is determined; and when the intensities of the detecting signals corresponding to the pair of parallel detecting electrodes increase, the intensities of the detecting signals corresponding to the second portion of the detecting electrodes are higher than the intensities of the detecting signals corresponding to the first portion of the detecting electrodes and the intensities of the detecting signals corresponding to the second portion of the detecting electrodes are symmetrical to each other, the bending event is determined; and wherein the first portion of the plural detecting electrodes and the second portion of the plural detecting electrodes are disposed on a same side of the receiver layer.

10. The bend sensing method as claimed in claim 9, wherein the step (a) comprises sub-steps of:
   (a1) normalizing the plural detecting signals;
   (a2) judging whether the status change event needs to be generated; and
   (a3) when the status change event does not need to be generated, repeatedly performing the step (a2), and when the status change event needs to be generated, generating the status change event.

11. The bend sensing method as claimed in claim 9, wherein the step (c) comprises sub-steps of:
   (c1) when the bending event is generated, triggering the bending event; and
   (c2) when a touch event is generated, triggering the touch event.

12. The bend sensing method as claimed in claim 9, wherein when the bending event is generated, the bend sensing method further comprises a step of increasing a count value of a bend counter by 1.

13. The bend sensing method as claimed in claim 12, wherein a display parameter or a sensing parameter of the flexible display panel is updated according to the count value of the bend counter.

14. The bend sensing method as claimed in claim 11, wherein when the touch event is triggered, a touch point is determined according to the plural detecting signals.

15. The bend sensing method as claimed in claim 11, wherein when the bending event is triggered, a bending direction or a bending angle of the flexible display panel is determined according to the plural detecting signals.

16. The bend sensing method as claimed in claim 15, further comprising a step of correlating the plural detecting signals with the bending direction or the bending angle according to a correlative relationship.

17. The bend sensing method as claimed in claim 16, wherein the correlative relationship is obtained by using a look-up table.

18. The bend sensing method as claimed in claim 16, wherein the correlative relationship is obtained by a systematic close-loop circuit.

19. A bend sensing system for a flexible display panel, the bend sensing system comprising:
   a touch panel, attached on the flexible display panel and including a receiver layer, and plural detecting electrodes disposed on the receiver layer, wherein a first portion of the plural detecting electrodes is disposed on a touch sensing zone of the receiver layer and a second portion of the plural detecting electrodes is disposed on a bend sensing zone of the receiver layer, wherein the second portion of the plural detecting electrodes comprises a pair of parallel detecting electrodes, and wherein each of the plural detecting electrodes generates a respective corresponding one of plural detecting signals according to a change of an electric field or a magnetic field; and
   a controlling circuit for
      receiving the plural detecting signals,
      generating a status change event according to plural detecting signals, and
      judging whether a bending event or a touch event is generated according to a relationship between the plural detecting signals and performing a corresponding control action, wherein
   when the intensity of one of the detecting signals corresponding to the first portion of the detecting electrodes is higher than the intensities of the other detecting signals corresponding to the first portion of the detecting electrodes and the intensities of the detecting signals corresponding to the pair of parallel detecting electrodes are not symmetrical to each other, the touch event is determined by the controlling circuit; and
   when the intensities of the detecting signals corresponding to the pair of parallel detecting electrodes increase, the intensities of the detecting signals corresponding to the pair of parallel detecting electrodes are higher than the intensities of the detecting signals corresponding to the first portion of the detecting electrodes, and the intensities of the detecting signals corresponding to the pair of parallel detecting electrodes are symmetrical, the bending event is determined by the controlling circuit; and
   wherein the first portion of the plural detecting electrodes and the second portion of the plural detecting electrodes are disposed on a same side of the receiver layer.

20. The bend sensing system as claimed in claim 19, wherein the controlling circuit comprises a memory module, a control processing module, a signal processing module, and a judging module.

21. The bend sensing system as claimed in claim 20, wherein a correlative relationship is stored in the memory module, wherein the plural detecting signals are correlated with a touch event or the bending event by the judging module according to the correlative relationship.

22. The bend sensing system as claimed in claim 21, wherein the control processing module generates the status change event according to the plural detecting signals and normalizing the plural detecting signals.

23. The bend sensing system as claimed in claim 22, wherein when the controlling circuit judges that the bending event is generated, the controlling circuit triggers the bending event, wherein when the controlling circuit judges that the touch event is generated, the controlling circuit triggers the touch event.

24. The bend sensing system as claimed in claim 23, wherein after the bending event or the touch event is triggered, the plural detecting signals are updated as reference signals by the controlling circuit.

25. The bend sensing system as claimed in claim 24, wherein the controlling circuit further compares the reference signals with newly-received detecting signals, wherein when the reference signals are not identical to the newly-received detecting signals, the controlling circuit generates the status change event.

26. The bend sensing system as claimed in claim 21, wherein when the controlling circuit judges that the touch event is generated, a touch point is determined by the controlling circuit according to the plural detecting signals.

27. The bend sensing system as claimed in claim 21, wherein when the controlling circuit judges that the bending event is generated, the controlling circuit increases a count value of a bend counter by 1.

28. The bend sensing system as claimed in claim 21, wherein a bending direction or a bending angle of the flexible display panel is determined by the controlling circuit according to the plural detecting signals.

* * * * *